United States Patent
Ni et al.

(10) Patent No.: US 10,528,600 B1
(45) Date of Patent: Jan. 7, 2020

(54) SYSTEM TO IDENTIFY UNKNOWN COMMUNICATION BEHAVIOR RELATIONSHIPS FROM TIME SERIES

(71) Applicant: HRL Laboratories, LLC, Malibu, CA (US)

(72) Inventors: Kang-Yu Ni, Calabasas, CA (US); Tsai-Ching Lu, Thousand Oaks, CA (US); Qin Jiang, Oak Park, CA (US); David J. Huber, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 16/034,139

(22) Filed: Jul. 12, 2018

Related U.S. Application Data

(60) Provisional application No. 62/557,944, filed on Sep. 13, 2017.

(51) Int. Cl.
*H04W 16/18* (2009.01)
*G06F 16/28* (2019.01)
*G06F 16/22* (2019.01)

(52) U.S. Cl.
CPC ........ *G06F 16/285* (2019.01); *G06F 16/2228* (2019.01); *H04W 16/18* (2013.01)

(58) Field of Classification Search
CPC ... G06N 7/00; G06N 5/02; G06N 5/04; G06F 16/285; G06F 16/2228; H04W 16/18
(Continued)

(56) References Cited

U.S. PATENT DOCUMENTS

| 5,528,516 A | * | 6/1996 | Yemini | ............... G06F 11/2257 702/181 |
| 5,661,668 A | * | 8/1997 | Yemini | ............... G06F 11/2257 702/186 |

(Continued)

OTHER PUBLICATIONS

N-K. Ni and T-C. Lu, Information Dynamic Spectrum Characterizes System Instability toward Critical Transitions, EPJ Data Science, 3:28, 2014, pp. 1-25.
(Continued)

*Primary Examiner* — Hai V Nguyen
(74) *Attorney, Agent, or Firm* — Tope-McKay & Associates

(57) ABSTRACT

Described is a system for identifying communication behavior patterns in communication activity time series. For each pair of variables in the communication activity time series, the system determines a transfer entropy measure, an effective transfer entropy measure from a randomly reordered version of the communication activity time series, and a partial effective transfer entropy measure. A dependency matrix is generated using pair-wised effective transfer entropy measures and partial effective transfer entropy measures, where each element in the matrix represents a total influence of a communication activity time series on another communication activity time series in the future. The dependency matrix is compared with dependency matrices generated from a predefined set of communication patterns to identify the communication behavior pattern. The system generates instructions regarding positioning of a sensor, such that the instructions provide guidance regarding placement of the sensor at a geographical region related to the identified communication pattern.

18 Claims, 11 Drawing Sheets

(58) Field of Classification Search
USPC .................................. 455/500; 706/46, 48
See application file for complete search history.

(56) References Cited

U.S. PATENT DOCUMENTS

| | | | | |
|---|---|---|---|---|
| 5,796,611 | A * | 8/1998 | Ochiai | G01W 1/10 702/3 |
| 5,892,517 | A * | 4/1999 | Rich | G06T 1/60 345/582 |
| 6,249,755 | B1 * | 6/2001 | Yemini | G06F 11/2257 702/183 |
| 6,324,679 | B1 * | 11/2001 | Raghunathan | G06F 17/5045 716/133 |
| 6,678,421 | B1 * | 1/2004 | Daniell | H04N 19/647 382/238 |
| 7,397,916 | B2 * | 7/2008 | Johnson | G06F 21/14 380/28 |
| 7,809,135 | B2 * | 10/2010 | Johnson | G06F 21/14 380/44 |
| 8,271,412 | B2 * | 9/2012 | Johnson | H04L 41/12 706/46 |
| 8,392,400 | B1 * | 3/2013 | Ransil | G06F 11/1446 707/716 |
| 8,775,411 | B1 * | 7/2014 | Ransil | G06F 11/1446 707/716 |
| 9,043,905 | B1 * | 5/2015 | Allen | H04L 63/1441 726/22 |
| 9,258,666 | B2 * | 2/2016 | Agrawal | H04W 76/10 |
| 9,443,521 | B1 * | 9/2016 | Olguin Olguin | G10L 17/00 |
| 9,552,384 | B2 * | 1/2017 | Narasimha | G06F 16/24561 |
| 9,609,010 | B2 * | 3/2017 | Sipple | H04L 63/1425 |
| 9,659,564 | B2 * | 5/2017 | Arslan | G10L 17/26 |
| 9,767,489 | B1 * | 9/2017 | Liu | H04L 67/32 |
| 9,792,551 | B1 * | 10/2017 | Lu | G06N 5/045 |
| 9,916,843 | B2 * | 3/2018 | Togawa | G10L 25/06 |
| 9,946,876 | B2 * | 4/2018 | Wojnowicz | G06F 21/565 |
| 9,979,738 | B2 * | 5/2018 | Holland | H04L 63/1416 |
| 10,003,985 | B1 * | 6/2018 | Holland | H04W 24/06 |
| 10,049,336 | B2 * | 8/2018 | Olguin Olguin | G06Q 10/0639 |
| 10,073,521 | B2 * | 9/2018 | Kim | G06F 3/011 |
| 10,089,360 | B2 * | 10/2018 | Narasimha | G06F 16/24561 |
| 10,091,218 | B2 * | 10/2018 | Holland | H04L 63/1416 |
| 10,110,976 | B2 * | 10/2018 | Bell | G01R 35/005 |
| 10,172,064 | B2 * | 1/2019 | Agrawal | H04W 76/10 |
| 10,217,465 | B2 * | 2/2019 | Grahm | G06F 1/163 |
| 2003/0204370 | A1 * | 10/2003 | Yemini | G06F 11/2257 702/183 |
| 2004/0139340 | A1 * | 7/2004 | Johnson | G06F 21/14 713/194 |
| 2005/0137832 | A1 * | 6/2005 | Yemini | G06F 11/2257 702/183 |
| 2006/0140401 | A1 * | 6/2006 | Johnson | G06F 21/14 380/44 |
| 2009/0024549 | A1 * | 1/2009 | Johnson | H04L 43/00 706/46 |
| 2009/0327270 | A1 * | 12/2009 | Teevan | G06F 16/337 |
| 2010/0332574 | A1 * | 12/2010 | Herbert | G06F 7/588 708/251 |
| 2014/0053248 | A1 * | 2/2014 | Hulusi | H04L 63/08 726/4 |
| 2014/0105174 | A1 * | 4/2014 | Agrawal | H04W 76/10 370/331 |
| 2014/0155706 | A1 * | 6/2014 | Kochs | A61B 5/021 600/301 |
| 2015/0101053 | A1 * | 4/2015 | Sipple | H04L 63/1425 726/24 |
| 2016/0045128 | A1 * | 2/2016 | Sitt | A61B 5/7246 600/409 |
| 2016/0095041 | A1 * | 3/2016 | Agrawal | H04W 76/10 370/332 |
| 2016/0143594 | A1 * | 5/2016 | Moorman | A61B 5/02405 705/2 |
| 2016/0328432 | A1 * | 11/2016 | Raghunathan | G06F 16/2228 |
| 2016/0371267 | A1 * | 12/2016 | Narasimha | G06F 16/24561 |
| 2017/0097960 | A1 * | 4/2017 | Narasimha | G06F 16/24561 |
| 2017/0220937 | A1 * | 8/2017 | Wada | G06N 5/025 |
| 2017/0308505 | A1 * | 10/2017 | Ni | G06F 17/14 |
| 2018/0100911 | A1 * | 4/2018 | Bell | G01R 35/005 |
| 2018/0100912 | A1 * | 4/2018 | Bell | G01R 35/005 |
| 2018/0103302 | A1 * | 4/2018 | Bell | G01R 35/005 |

OTHER PUBLICATIONS

J. Borge-Holthefer, N. Perra, B. Goncalves, S. Gonzalez-Bailon, A. Arenas, Y. Moreno, and A. Vespignani. The dynamics of information-driven coordination phenomena: A transfer entropy analysis, Science Advance, 2:5, e1501158 2016, pp. 1-8.

C. E. Shannon, A Mathematical Theory of Communication. Bell System Technical Journal 27 (3): pp. 379-423, 1948.

T. Schreiber, Measuring information transfer. Phys Rev Lett 2000, 85(2): pp. 461-464, 2000.

Marschinski, Robert, and H. Kantz, Analysing the information flow between financial time series. The European Physical Journal B-Condensed Matter and Complex Systems 30.2, pp. 275-281, 2002.

Junior, Leonidas Sandoval, Asher Mullokandov, and Dror Y. Kenett. Dependency relations among international stock market indices. Journal of Risk and Financial Management 8.2, pp. 227-265, 2015.

N-K. Ni and T-C. Lu, Information Dynamic Spectrum Characterizes System Instability toward Critical Transitions, EPJ Data Science, 3: p. 28, 2014.

Batty, Michael, et al. "Entropy, complexity, and spatial information." Journal of geographical systems 16.4 (2014): pp. 363-385.

T. Schreiber, "Measuring information transfer," Phys Rev Lett, 2000, 85(2): pp. 461-464.

\* cited by examiner

SYSTEM TO IDENTIFY UNKNOWN COMMUNICATION BEHAVIOR RELATIONSHIPS FROM TIME SERIES

GOVERNMENT LICENSE RIGHTS

This invention was made with government support under U.S. Government Contract Number PC 1141899. The government may have certain rights in the invention.

CROSS-REFERENCE TO RELATED APPLICATIONS

This is a Non-Provisional Application of U.S. Provisional Application No. 62/557,944, filed in the United States on Sep. 13, 2017, entitled, "Identify Unknown Communication Behavior Relationships from Time Series and Detect their Changes," the entirety of which is incorporated herein by reference.

BACKGROUND OF INVENTION

(1) Field of Invention

The present invention relates to a system for discovering unknown communication behavior relations and, more particularly, to a system for discovering unknown communication behavior relations from time series.

(2) Description of Related Art

Information theory is the study of the quantification, storage, and communication of information. Prior work in the area of information-theoretic measure includes Shannon entropy (see Literature Reference No. 3 in the List of Incorporated Literature References), transfer entropy (see Literature Reference No. 3), and using derived measure to detect and predict emerging phenomena in complex systems (see Literature Reference Nos. 1 and 2). Marschinski et al. (see Literature Reference No. 5) developed effective transfer entropy (ETE), and Junior et al. (see Literature Reference No. 6) extended ETE to the definition of the dependency matrix based on the concept of partial correlation. Both of these prior art references apply the measures to financial market time series to discover relations between the time series. Additionally, activity and behavior detection in complex systems was described in U.S. application Ser. No. 15/497,202, entitled, "Multilayer Information Dynamics for Activity and Behavior Detection," which is hereby incorporated by reference as though fully set forth herein. However, existing art has not looked at behavior motifs or attempted to detect changes.

Thus, a continuing need exists for a system for discovering underlying communication behavior relations (behavior patterns, behavior graphs, behavior motifs) from the communication activity levels of each entity.

SUMMARY OF INVENTION

The present invention relates to a system for discovering unknown communication behavior relations and, more particularly, to a system for discovering unknown communication behavior relations from time series. The system comprises one or more processors and a memory having instructions such that when the instructions are executed, the one or more processors performs multiple operations. The system identifies a communication pattern from a plurality of communication activity time series of a set of variables. For each pair of variables in the set of variables, a transfer entropy (TE) measure is determined. For each pair of variables in the set of variables, an effective transfer entropy (ETE) measure is determined from a randomly reordered version of the plurality of communication activity time series. For each pair of variables in the set of variables, a partial effective transfer entropy (PETE) measure is determined, resulting in a plurality of pair-wised ETE measures. A dependency matrix comprising elements is generated using the plurality of pair-wised ETE measures and PETE measures, where each element in the dependency matrix represents a total influence of a communication activity time series on another communication activity time series in the future. The dependency matrix is compared with dependency matrices generated from a predefined set of communication patterns, and the communication pattern is identified. The system generates instructions regarding positioning of at least one sensor using the identified communication pattern, such that the instructions provide guidance regarding placement of the at least one sensor at a geographical region related to the identified communication pattern.

In another aspect, a plurality of dependency matrices are generated from the plurality of communication activity time series, each dependency matrix representing a distinct time point in a series of time points.

In another aspect, changes in communication behavior over time are detected by determining a relative error using a first dependency matrix representing a first time point and a second dependency matrix representing a second time point following the first time point.

In another aspect, a prediction of changes in communication behavior is generated using the relative error and a relative error change determined using the first dependency matrix representing the first time point, the second dependency matrix representing the second time point following the first time point, and a third dependency matrix representing a third time point preceding the first time point.

In another aspect, change points in the plurality of communication activity time series are detected.

In another aspect, generating the dependency matrices from the predefined set of communication patterns further comprises operations of simulating communication activity time series for the predefined set of communication patterns; and generating a dependency matrix for each communication pattern in the predefined set of communication patterns.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
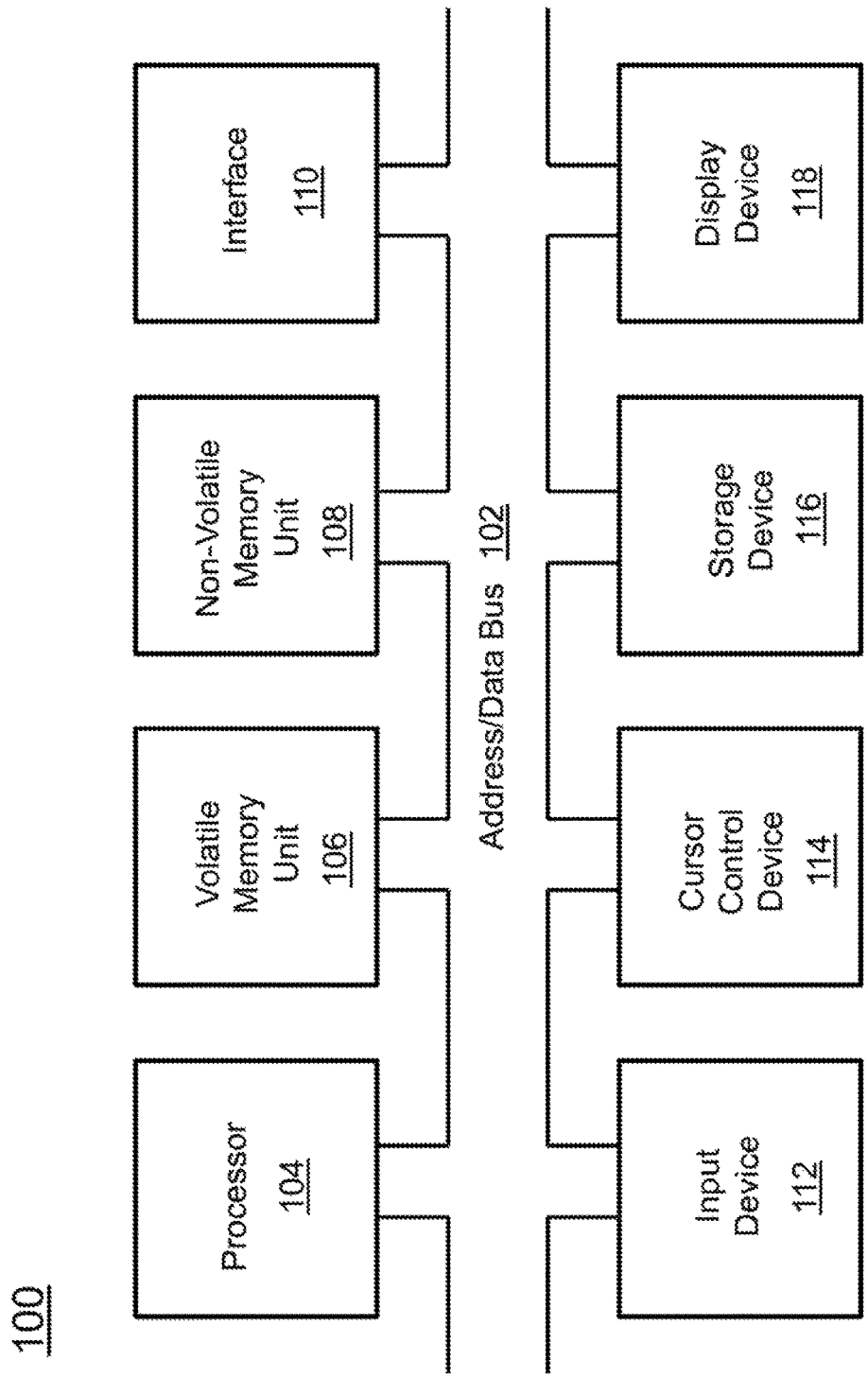
FIG. 1 is a block diagram depicting the components of a system discovering unknown communication behavior relations according to some embodiments of the present disclosure.

The present invention relates to a system for discovering unknown communication behavior relations and, more particularly, to a system for discovering unknown communication behavior relations from time series. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) LIST OF INCORPORATED LITERATURE REFERENCES

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number as follows:

1. N-K. Ni and T-C. Lu, Information Dynamic Spectrum Characterizes System Instability toward Critical Transitions, EPJ Data Science, 3:28, 2014.
2. J. Borge-Holthefer, N. Perra, B. Goncalves, S. Gonzalez-Bailon, A. Arenas, Y. Moreno, and A. Vespignani. The dynamics of information-driven coordination phenomena: A transfer entropy analysis, Science Advance, 2:5, e1501158, 2016.
3. C. E. Shannon, A Mathematical Theory of Communication. Bell System Technical Journal 27 (3): 379-423, 1948.
4. T. Schreiber, Measuring information transfer. Phys Rev Lett 2000, 85(2):461-464, 2000.
5. Marschinski, Robert, and H. Kantz, Analysing the information flow between financial time series. The European Physical Journal B-Condensed Matter and Complex Systems 30.2, 275-281, 2002.
6. Junior, Leonidas Sandoval, Asher Mullokandov, and Dror Y. Kenett. Dependency relations among international stock market indices. Journal of Risk and Financial Management 8.2, 227-265, 2015.

(2) PRINCIPAL ASPECTS

Various embodiments of the invention include three "principal" aspects. The first is a system for discovering unknown communication behavior relations. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
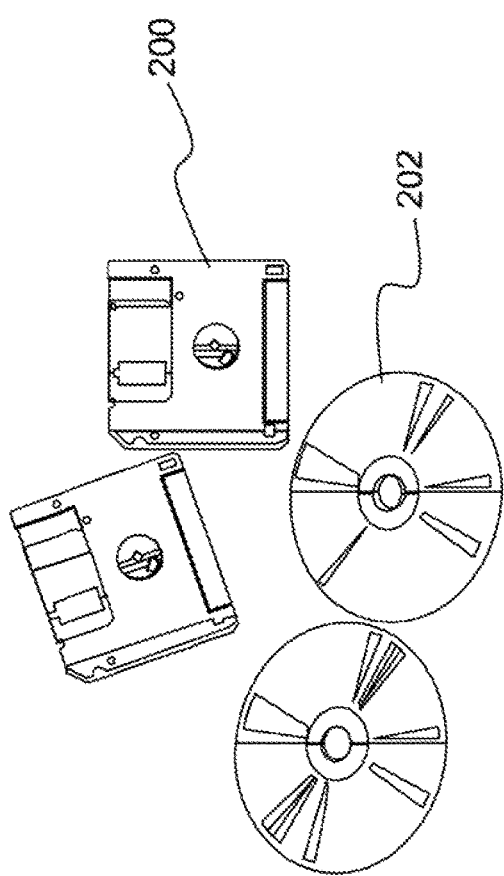
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) SPECIFIC DETAILS OF VARIOUS EMBODIMENTS OF THE INVENTION

Described is a system for novel behavior anticipation with behavior identification and characterization under different operation regime transitions. The application of effective transfer entropy and partial dependency matrix computation to analyze communication activities is unique to the invention. As will be described in detail below, experimental studies demonstrated unsupervised identification of communication behavior patterns. Algorithms were developed to infer communication behavior patterns and detect changes, and the methods have been demonstrated with 100% accuracy with simulated data.

The system according to embodiments of the present disclosure infers and identifies unknown sender-receiver pairs from a group of entities, such as ships or vessels, from their activity time series, as well as the changes of communication behavior patterns. The method described herein does not assume specific models for the time series and addresses the challenge of multiple entities. Additionally, the method is able to detect communication behavior patterns of a group of vessels as the behavior patterns change over time. For example, if vessel B is getting information from vessel A, there is a link (or edge or connection) going from vessel A to vessel B in a graph representation. Such a link can appear and disappear over time.

In the disclosed system, algorithms were developed to anticipate complex system behaviors, specifically inferring communication behavior relationships of a group of entities (or variables) and detecting the changes. It is difficult to identify the interactions, and it is also challenging to detect when the interactions are changing over time. For instance, for a group of vessels, some vessels are getting information from some other specific vessels. The method described herein can be utilized to infer pairwise relations between vessels according to how they interact with one another. The challenges are more than inferring and identification of the unknown sender-receiver pairs from their activities, because pairwise relations within a group can be corrupted by confounding factors and noise contamination that are often not separable.

For example, suppose one would like to monitor maritime activities, in particular the communication patterns of fishing fleet, such as ship-to-ship, ship-to-shore, and ship-to-central office communications. In addition, suppose one can detect the collective communications between regions after dividing the geographical locations into a number of regions. The problem that the invention described herein solves is to detect communication behaviors and patterns, such as the regions providing information (senders), the regions acquiring information (receivers), and if there are certain sender-receiver group structures that are beyond pairwise relations (e.g., fan-out, fan-in, feedforward, feedback, bi-parallel). In addition, the system described herein monitors the behaviors and structures and detects changes early.

Figure 3:
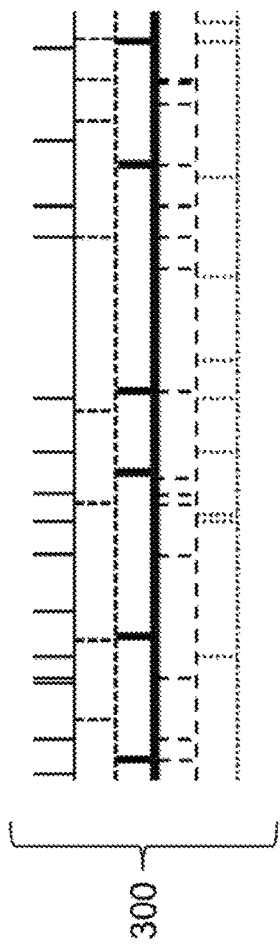
FIG. 3 is an illustration of unsupervised identification of communication behavior patterns according to some embodiments of the present disclosure.
Figure 3:
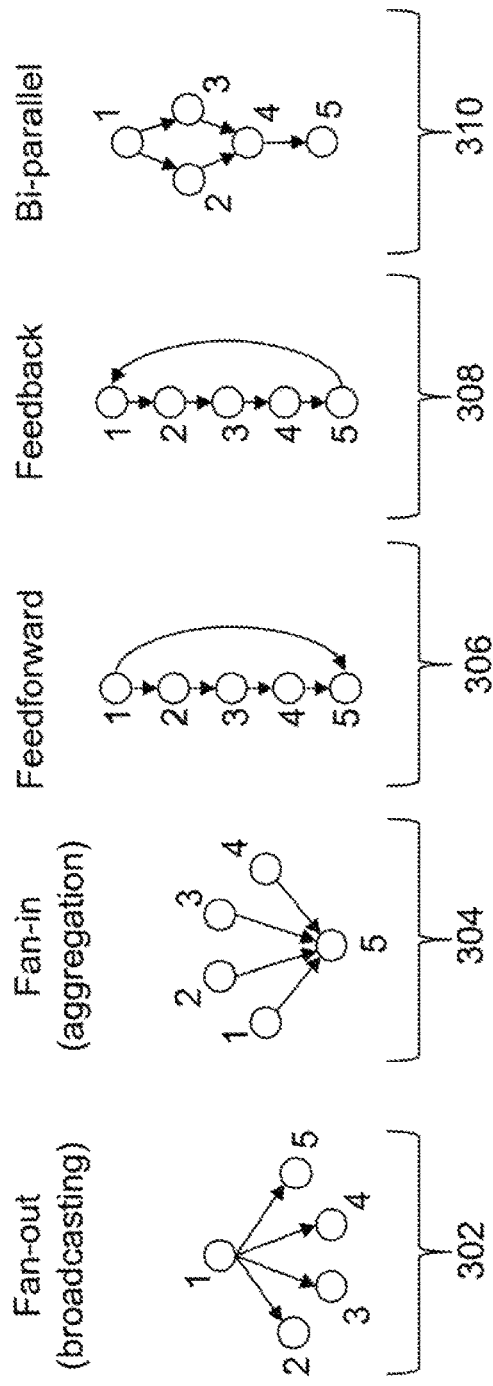
Figure 4:
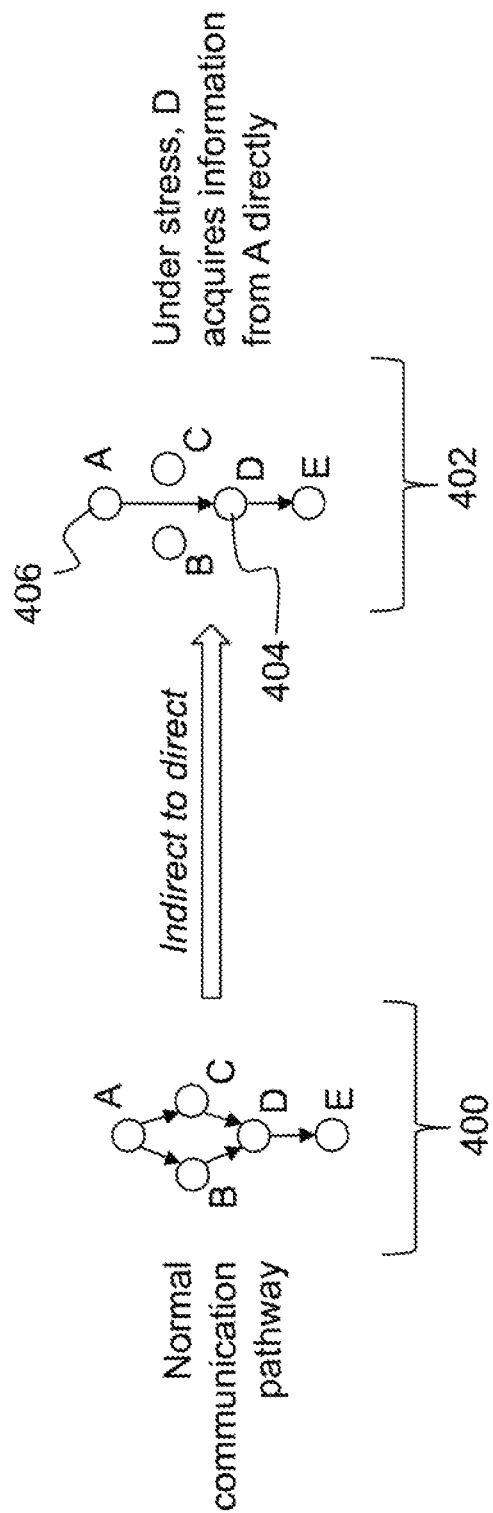
FIG. 4 is an illustration of detection of behavior changes under different operation regimes according to some embodiments of the present disclosure.
Figure 5:
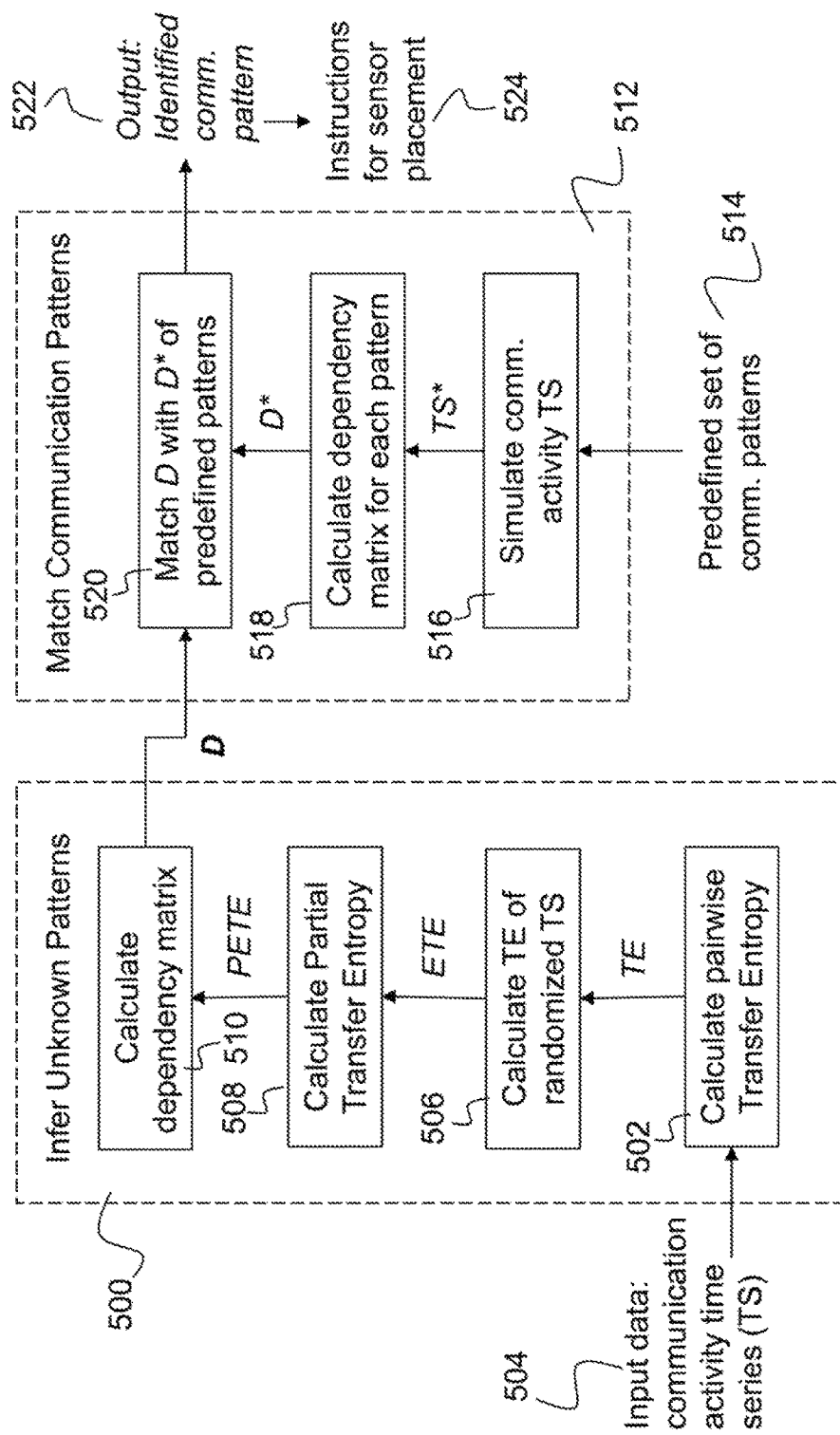
FIG. 5 is a flow diagram illustrating unsupervised identification of communication behavior patterns according to some embodiments of the present disclosure.
Figure 6:
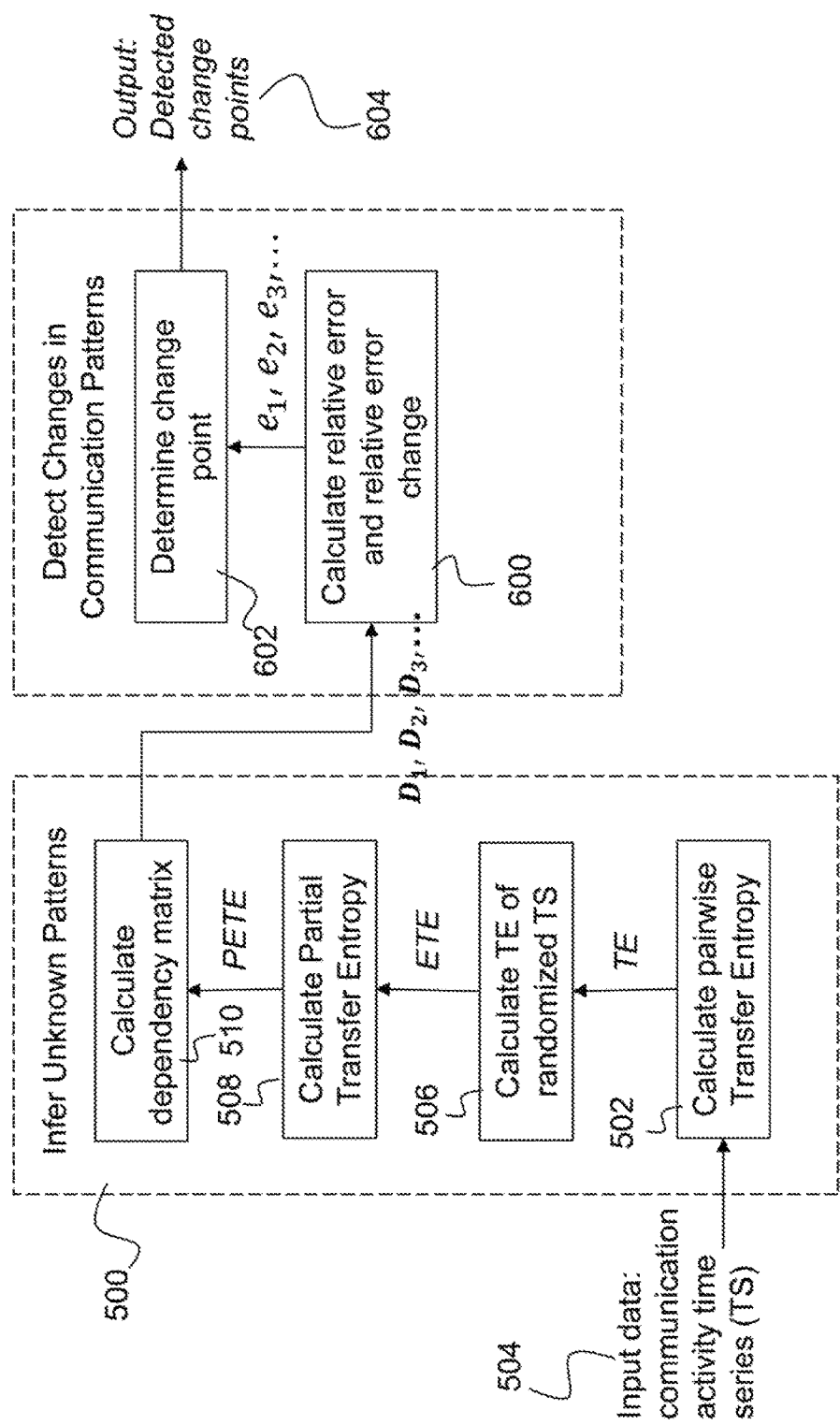
FIG. 6 is a flow diagram illustrating detection of behavior change points according to some embodiments of the present disclosure.

A method for unsupervised identification of communication behavior patterns is depicted in FIG. 3, and a method for detection of behavior changes under different operation regimes (e.g., normal vs. stress situations) is shown in FIG. 4. FIGS. 5 and 6 show the corresponding flow diagrams for a method for unsupervised identification of communication behavior patterns, and a method for detection of behavior changes, respectively.

FIG. 3 illustrates a set of input activity time series (element 300) and communication patterns, including a fan-out (broadcasting) pattern (element 302), a fan-in (aggregation) pattern (element 304), a feedforward pattern (element 306), a feedback pattern (element 308), and a bi-parallel pattern (element 310). Each of these patterns will be described in further detail below.

FIG. 4 depicts a normal communication pathway (element 400), where information from one node to another is acquired indirectly. The nodes may be physical network nodes (e.g., data communication equipment (modem, hub, bridge, switch), data terminal equipment (host computer, digital telephone handset). Additionally, the nodes can be local area network (LAN) nodes, wide area network (WAN) nodes, internet nodes, or radio nodes. In a communication pathway under stress (element 402), D node 404 acquires information from A node 406 directly. These pathways will be described in further detail below.

As shown in FIG. 5, during a process of inferring unknown patterns (element 500), the system calculates pairwise transfer entropy (TE) (element 502) from input data (element 504) that is in the form of communication activity time series (TS). Pairwise TE is a TE measure calculated between two time series. Then, the system calculates transfer entropy (TE) of randomized TS (element 506) to generate ETE. Partial transfer entropy is calculated (element 508), resulting in PETE. A dependency matrix D is calculated (element 510), which is an input to the match communication patterns process (element 512). The match communication pattern process (element 512) first receives as input a predefined set of communication patterns (element 514). The system then simulates communication activity TS (element 516), resulting in TS*. A dependency matrix D* is calculated for each pattern (element 518). Using the dependency matrix D from the infer unknown patterns process (element 500), D is matched with D* of predefined communication patterns (element 520), and the output is an identified communication pattern (element 522).

FIG. 6 is a flow diagram depicting a method for detection of behavior changes. Similar to the method shown in FIG. 5, in the infer unknown patterns process (element 500), the system calculates pairwise transfer entropy (TE) (element 502) from input data (element 504) that is in the form of communication activity time series (TS). Then, the system calculates transfer entropy (TE) of randomized TS (element 506) to generate ETE. Partial transfer entropy is calculated (element 508), resulting in PETE. Multiple dependency matrices $D_1$, $D_2$, and $D_3$, . . . are calculated (element 510), each of which corresponds to TS within a time window. In this method, the detect changes in communication patterns process (element 606) calculates relative error and relative error change ($e_1$, $e_2$, and $e_3$, . . . ) (element 600) to determine a change point (element 602), and the detected change points are output (element 604). Relative error of the current dependency matrix and the next timestep dependency matrix is the norm of the difference between them normalized by the current dependency matrix. This is the first-order difference. Relative error change is the norm of the difference between the current dependency matrix and the previous timestep dependency matrix.

(3.1) Communication Dynamic Model

Suppose that communication activity can be detected and measured (such as radio frequency (RF) signals), but there is no information about who is trying to gather information from whom. In the graph modeling of the communication behavior relationships according to embodiments of the present disclosure, each node represents a geographical region (or zone) on which one can measure the amount of collective communication activities, rather than activities of a single vessel or ship. The measurements are time series, each of which represents the communication activity amount of each node. Once a sender and receiver node are determined, that information can be used to determine the communication patterns and infer future vessel movement. The information can also be utilized to monitor changes in communication patterns and, therefore, monitor changes in vessel movement.

The communication dynamic model described herein is inspired by neural activities, but the method to detect the unknown relations and change point does not depend on this specific model. Suppose A is a sender node and C is a receiver node. If A is active at time t, then C is active at a later time t+Δt with some probability. The setup demonstrates how the technology can identify the implicit (hidden and unknown) C2 chains (two nodes and a directed edge from one node to another as shown in 700 of FIG. 7), or find send-receiver pairs of adversarial activities, and anticipate emerging changes due to intrinsic operation regimes, or external environmental constraints. External environmental constraints refer to additional environmental constraints. For instance, in maritime activities, weather conditions can disrupt routes of ship movements. In the communication domain, an external environmental constrain can be a building or denial-of-service that interferes with communication frequency.

Intrinsic operation regimes are staged adversary activities. They can be considered as waypoints. For example, when a ship goes from an origination port to a destination port, there will be various waypoints that have been planned routes and to move along those routes, there are operation regimes of a ship. For instance, in order to cruise at a certain speed, the ship will need to accelerate. The possible routes and the moving speeds can be considered to anticipate the behaviors of the ships (e.g., making turns to a certain route).

In the communication domain, intrinsic operation regimes can be protocols. For instance, a sender initiates communication and a receiver acknowledges the communication (e.g., handshake protocol). Then, data transmission starts, becomes periodic heartbeats, resume active transmission, etc. As is understood by one skilled in the art, a handshake in this context is an automated process of negotiation between two communicating parties through the exchange of information that established protocols of a communication link at the start of the communication. The handshaking protocol establishes rules for communication with a computer attempts to communicate with another device (e.g., modem). A heartbeat protocol is used to negotiate and monitor the availability of a resource and indicate the health of a machine.

Figure 7:
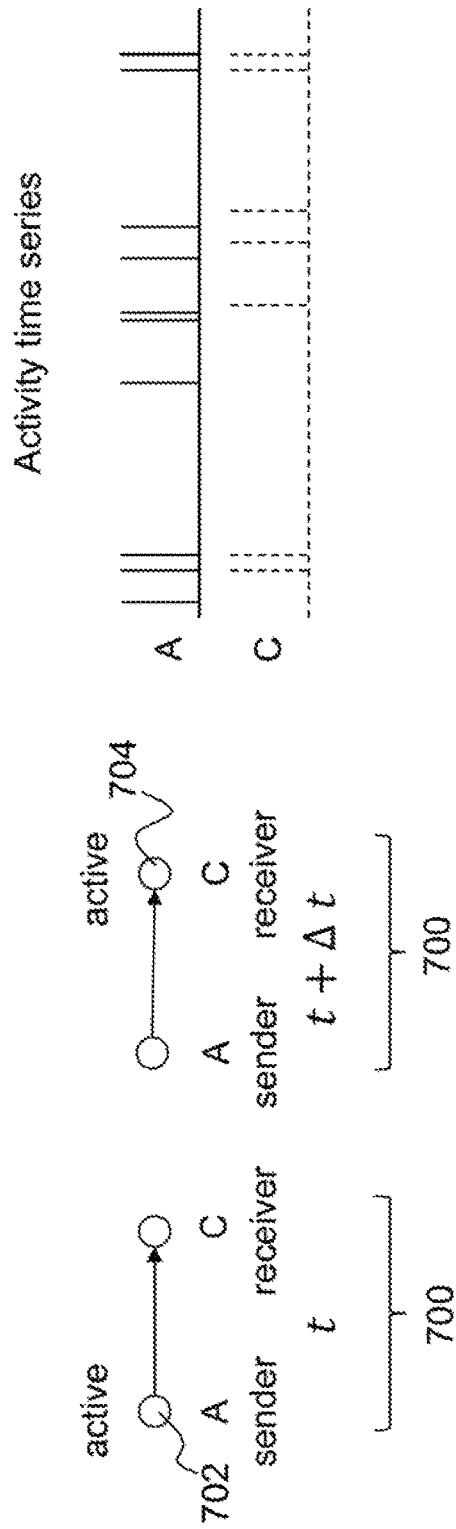
FIG. 7 is an illustration of the communication dynamic simulation model according to some embodiments of the present disclosure.

FIG. 7 illustrates the communication dynamic simulation model of the invention. Given a sender-receiver pair (element 700), the sender node (element 702) is randomly active with probability p (e.g., p=0.01). The receiver node (element 704) is active after a random delay Δt with an exponential distribution (i.e., receivers (element 704) are active at t+Δt with probability of $e^{-a\Delta t}$ after the sender (element 700) is active at time t). a denotes a positive real number that determines how fast the probability decreases from 1 to 0 as Δt goes from 0 to infinity.

(3.2) Detect Sender-Receiver Pairs with Transfer Entropy

The method according to this disclosure uses transfer entropy to identify the sender-receiver pairs from the observed time series. Transfer entropy (TE) (described in Literature Reference No. 3) is a directional measure that quantifies the amount of information transferred (or the amount of uncertainty reduced) from the current and past states to the future from one time series (or random variable) to another. TE is used to identify the causal relationships (in the sense of Granger Causality) between nodes' activities. Granger Causality is a statistical concept that is used to determine whether one time series is useful in forecasting another time series.

The interactions between nodes are abstracted from their activities using a graph with nodes and causal links, where each node is a region or zone and TE measures are used as causal links. Therefore, the links are directional. The TE measure from node $x_j$ to node $x_i$ is defined as:

$$TE_{x_i \to x_j} = \sum p(x_{j,t+\tau}, x_{j,t}, x_{i,t}) \log \frac{p(x_{j,t+\tau} | x_{j,t}, x_{i,t})}{p(x_{j,t+\tau} | x_{j,t})},$$

where τ is the time delay of information transfer. In the example above, $TE_{A \to C}$ is relatively large, while $TE_{C \to A} \approx 0$ approximately zero. In the TE measure, $x_i$ is the time series of node i: $x_i = \{x_i(1), x_i(2), \ldots, x_i(N)\}$; $x_j$ is the time series of node j: $x_j = \{x_j(1), x_j(2), \ldots, x_j(N)\}$; $x_{i,t} = x_i(t)$; $x_{j,t} = x_j(t)$; $x_{j,t+\tau} = x_j(t+\tau)$; and p ($x_{j,t+\tau}, x_{j,t}, x_{i,t}$) is the joint probability of $x_{j,t+\tau}, x_{j,t}, x_{i,t}$. Given three values a, b, c, $p(x_{j,t+\tau}=a, x_{j,t}=b, x_{i,t}=c)$ represents the probability that $x_{j,t+\tau}=a, x_{j,t}=b, x_{i,t}=c$ occurs at the same time. $p(x_{j,t+\tau}|x_{j,t}, x_{i,t})$ is the conditional probability, the probability of $x_{j,t+\tau}$ conditioned on $x_{j,t}, x_{i,t}$. Given three values a, b, c, $p(x_{j,t+\tau}=a|x_{j,t}=b, x_{i,t}=c)$ represents the probability of $x_{j,t+\tau}=a$ when $x_{j,t}=b$ and $x_{i,t}=c$. $p(x_{j,t+\tau}|x_{j,t})$ is the conditional probability, the probability of $x_{j,t+\tau}$ conditioned on $x_{j,t}$. Given two values a, b, $p(x_{j,t+\tau}=a|x_{j,t}=b)$ represents the probability of $x_{j,t+\tau}=a$ when $x_{j,t}=b$, and log is the logarithm to base 2.

(3.3) Identify Unknown Communication Structures

The activity time series of each node was simulated according to a variety of communication structures: fan-out (broadcasting), fan-in (aggregation), feedforward loop, feedback loop, and bi-parallel. An a-priori unknown communication structure is discovered with TE matrix (TEM). For a system of N nodes, an N×N TE matrix (TEM) is constructed, where the $ij^{th}$ entry is $TE_{x_j \to x_i}$. Then, this TEM is used as the adjacency matrix of a graph that represents the inherent communication structure. The entries of an adjacency matrix represent if there is a connection from one node to another. If the $ij^{th}$ entry is zero, it means that there isn't an edge going from node i to node j. If the $ij^{th}$ entry is nonzero, there is an edge going from node i to node j.

To remove noise contamination, Effective Transfer Entropy (ETE) (described in Literature Reference No. 5) is applied to calculate the TE over randomized data, where each observed activity time series is randomly reordered. This randomization removes any causality between time series, while maintaining the activity frequency in the original time series. The ETE is defined as the TE of original time series minus the TE of a randomized time series as follows:

$$ETE_{x_i \to x_j} = TE_{z_i \to z_j} = \sum p(z_{j,t+\tau}, z_{j,t}, z_{i,t}) \log \frac{p(z_{j,t+\tau} | z_{j,t}, z_{i,t})}{p(z_{j,t+\tau} | z_{j,t})},$$

where $z_i$ is a randomized time series of $x_i$ by randomly reordering of the sequence $\{x_i(1), x_i(2), \ldots, x_i(N)\}$, and $z_j$ is a randomized time series of $x_j$ by randomly reordering the sequence $\{(x_j(1), x_j(2), \ldots, x_j(N)\}$.

To mitigate confounding factors, first build the dependency matrix D using pair-wised ETE (described in Literature Reference No. 6) (i.e., each element in the matrix D is a ETE between a pair of variables). The definition of the dependency matrix D is inspired by partial correlation. The $ij^{th}$ entry of D is the total influence of i on j in the future:

$$D_{ij} = \frac{1}{N} \sum_{1 \le k \le N, k \ne j} [ETE_{i \to k} - PETE(i, k \mid j)],$$

where $$PETE(i, k \mid j) = \frac{ETE_{i \to k} - ETE_{i \to j} ETE_{k \to j}}{\sqrt{(1 - ETE_{i \to j}^2)(1 - ETE_{k \to j}^2)}}$$

is the partial ETE.

Figure 8:
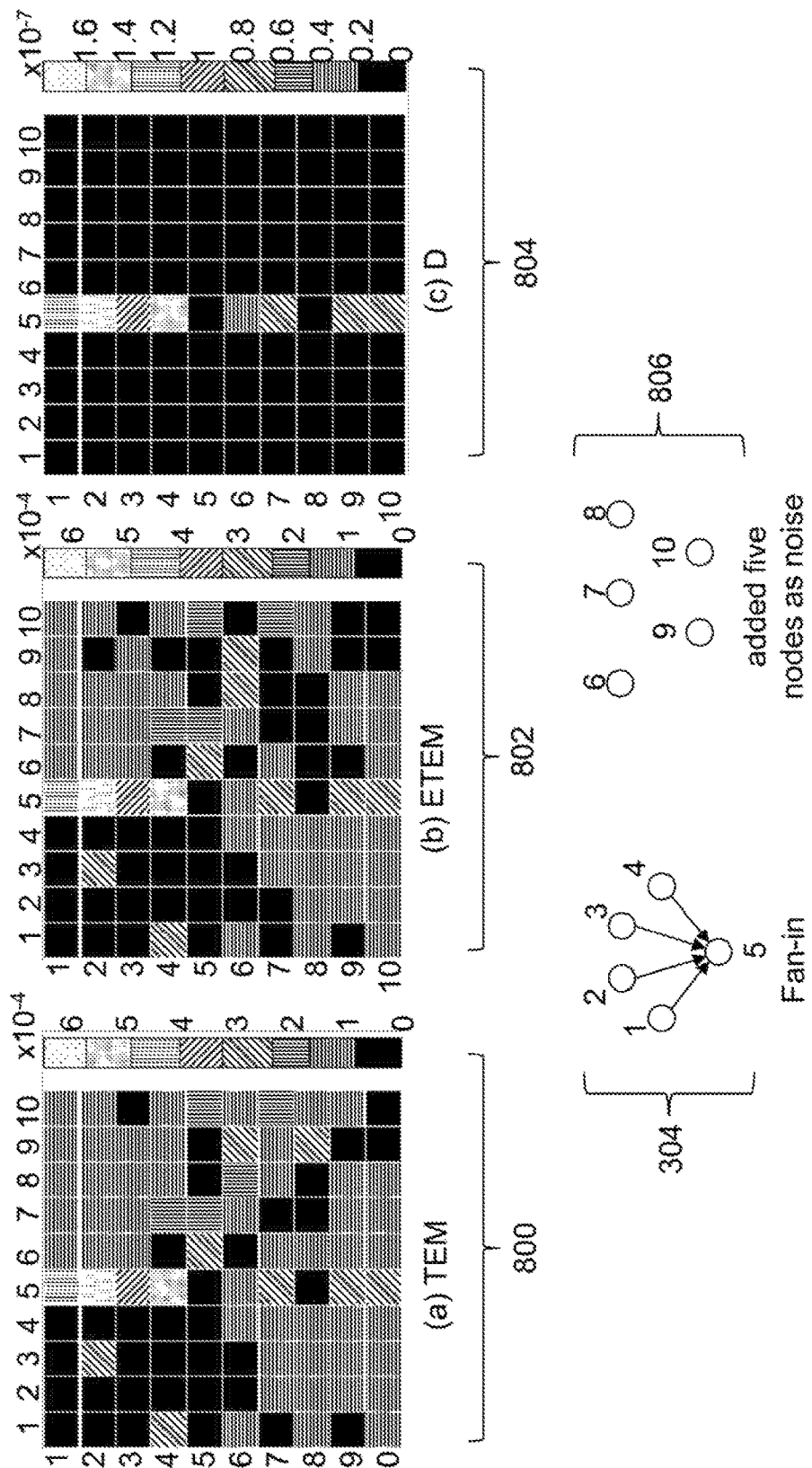
FIG. 8 is an illustration for the TE matrix (TEM), effective transfer entropy matrix (ETEM), and dependency (D) matrix for the fan-in communication structure according to some embodiments of the present disclosure.

FIG. 8 illustrates a TEM (element 800), an ETEM (element 802), and a D matrix (element 804). Below is a description of TEM, ETEM, and D matrices for the fan-in communication structure (element 304). An additional five nodes (element 806) were added whose activities are unrelated to the first five nodes. The purpose of adding these nodes is to add noise to the system. The entries that have relatively large values are $M_{15}$, $M_{25}$, $M_{35}$, $M_{45}$, for all three matrices (elements 800, 802, and 804), which correctly correspond to the communication graph structure. The D matrix (element 804), however, is able to effectively remove confounding factors, suppressing the rest of the entries in the matrix. This is because most of the entries in the D matrix are zero, and the nonzeros entries that have relatively large values are consistent with the Fan-in graph. That is, entries $D_{15}$, $D_{25}$, $D_{35}$, $D_{45}$ correspond to the directed edges 1→5, 2→5, 3→5 and 4→5. The sampling rate is dt=0.1 second. The active probability of node 1 is 1%. The influence activity probability for 1→5, 2→5, 3→5 and 4→5 is 50%, mean delay 3*dt with distribution $e^{-a\Delta t}$. The time series length is 3 hours. A communication pattern is a graph structure (e.g., element 304 in FIG. 8).

In FIG. 8, the labels 1 through 10 on the rows and columns of the matrices correspond to the node labels of the fan-in (aggregation) pattern (element 304) and the additional five nodes (element 806). Each node can represent a person or transmitter, or can represent an area. In this case, the communication time series of that area is the collective communication of all the persons or transmitters in that area. The TEM (element 800) is a 10-by-10 matrix, where each entry is a transfer entropy (TE) value. For example, the value of {row 1, column 5} represents the TE value from node 1 to node 5. A large value indicates the presence of a communication pattern from one node to another, and in this example, it corresponds to a directed edge going from node 1 to node 5 (element 304). Differences in TE values are indicated by differences in the pattern of the intersection (e.g., solid square versus horizontal lines). The different values in the matrices can also be represented by different colors. In either representation, the intersection of a row and column plus the pattern/color of the intersection shows the presence of a particular communication pattern between two parties. Thus, the pattern/color indicators (and any changes thereof) in the matrices can be displayed and used to alert a user of the occurrence of a particular communication pattern between persons or nodes.

(3.4) Experimental Studies (3.4.1) Number of Samples Needed to Discover the Structure Below is a description of the fan-out structure example (also with additional five nodes as noise) and shown in FIG. 9. As more samples are accumulated over time, the dependency matrix D converges after a short time and converges correctly to the fan-out structure, where the entries $D_{12}$, $D_{13}$, $D_{14}$, $D_{15}$ have relatively large values. The D matrix is used to represent the adjacency matrix of a graph. At time 00:28:00.10 (later time), the D matrix has relatively larger values in entries $D_{12}$, $D_{13}$, $D_{14}$, $D_{15}$ (which correspond to the directed edges 1→2, 1→3, 1→4, 1→5) and either smaller values or zero everywhere else. Non-limiting examples of specifications of the ten simulated time series according to the fan-out structure are 3 hours of data, sampling rate dt=0.1 second, node 1: active probability=1%, and 1→2, 1→3, 1→4, 1→5 active probability=50%, mean delay 3*dt with distribution $e^{-a\Delta t}$.

Figure 9:
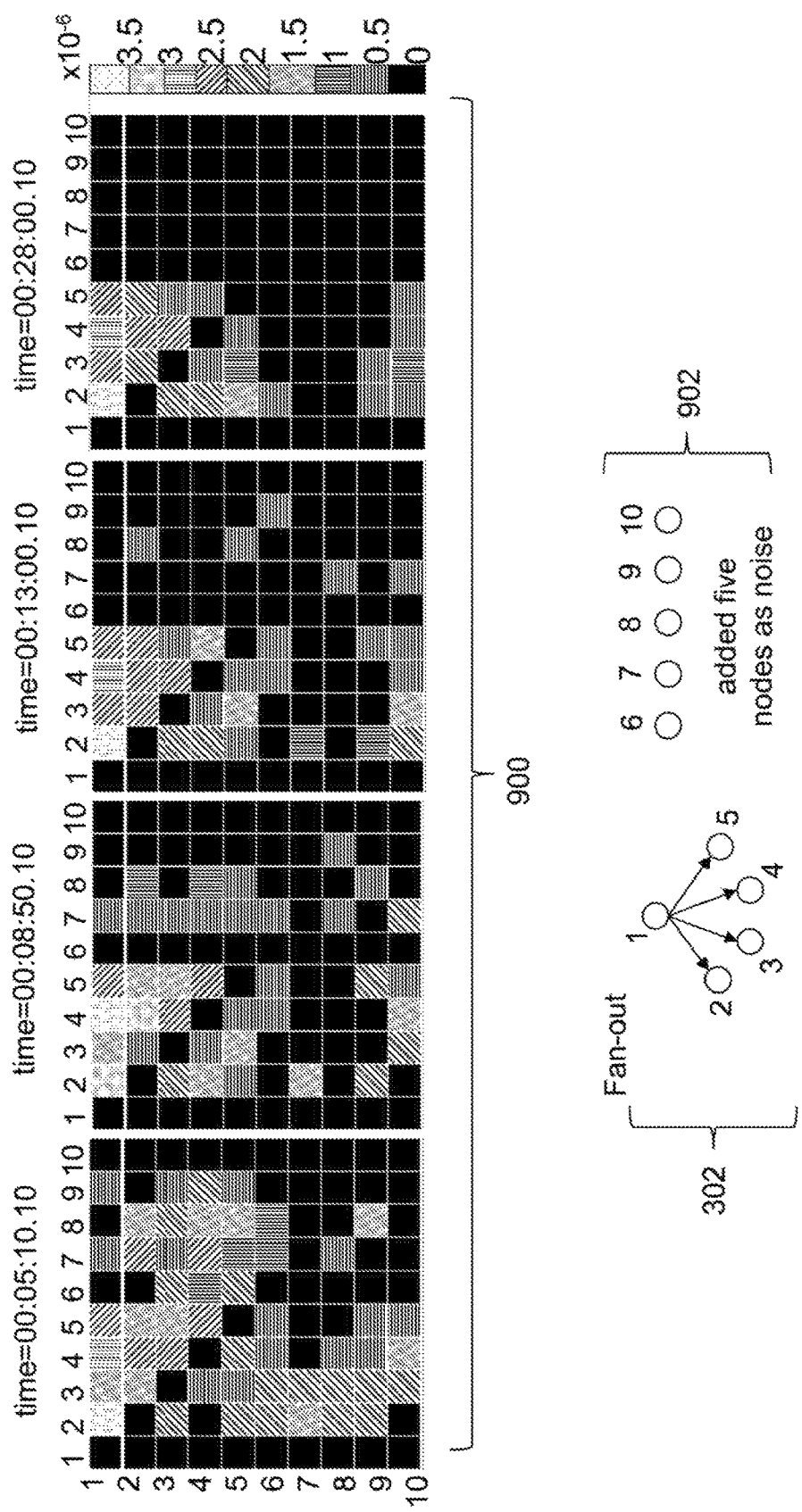
FIG. 9 is an illustration of four TEMS according to some embodiments of the present disclosure.

FIG. 9 depicts four TEMs (element 900) at the D matrices, where each TEM represents a different timepoint. As more samples arrive (i.e., more time passes), the algorithm according to embodiments of the present disclosure converges to the correct detection of the fan-out structure (element 302) also with additional five nodes as noise (element 902).

(3.4.1.1) Infer Hidden Communication Patterns with the D Matrix

Figure 10:
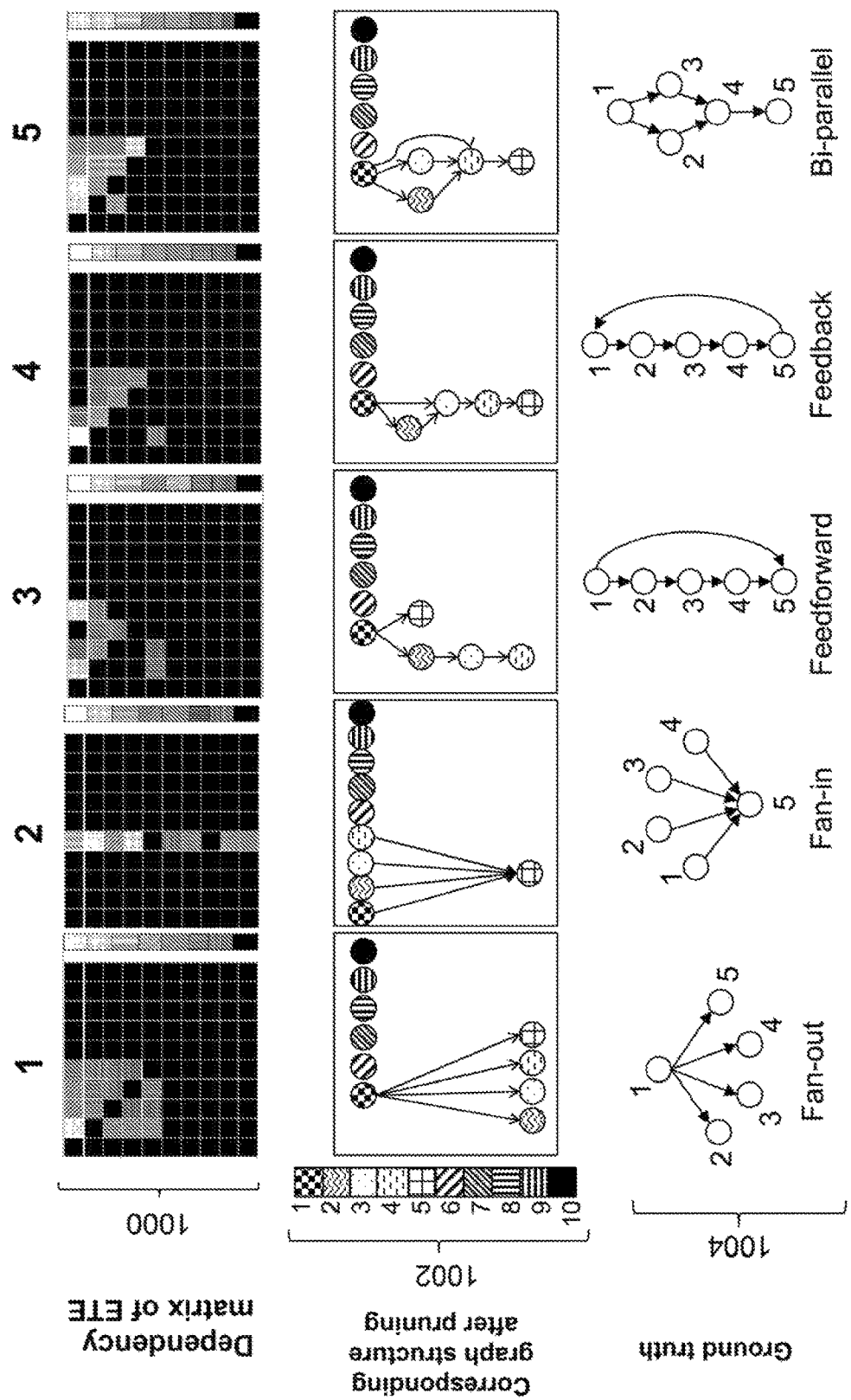
FIG. 10 is an illustration of D matrices, the corresponding graphs using the pruned D matrices as graph adjacency matrices, and ground truth structures according to some embodiments of the present disclosure.

The use of dependency matrix to infer unknown communication structures is described below and depicted in FIG. 10. The top row (element 1000) shows the D matrices of ETE for communication structures 1-5, fan-out, fan-in, feedforward, feedback, and bi-parallel, respectively. The middle row (element 1002) are the corresponding graphs using the pruned D matrices as graph adjacency matrices. The fan-in and fan-out communication structures are accurately recovered. In other words, the corresponding graph structure after pruning coincides with the ground truth graph. The sender-receiver pair 4→5 in the feedforward loop was not strong enough to be detected. For the feedback loop, the sender-receiver pair 5→1 in was not strong enough to be detected. However, their D matrices are distinguishable. For the bi-parallel communication structure, the graph represented by the D matrix has an extra link from 1 to 4. A second order partial correlation applied to the ETE may be able to remove this extra link. The bottom row (element 1004) depicts the ground truth structures.

(3.4.2) Detect Communication Structure from a Pre-Defined Set

To quantify accuracy in detecting a pre-defined set of communication structures, the Frobenius norm is used to find the best match of the dependency matrix. The following experiments were conducted with 100% accuracy.

1. Generate 10 sets of simulated data for each structure.
2. Perform leave-1-out cross validation: use 1 set (one for each structure) as template (can generalize the training set), and evaluate the other 9 sets of data.
3. Match the dependency matrix to determine the communication structures, with the Frobenius norm (F) of dependency matrix with template matrices.
4. Achieve accuracy rate: 100% (450/450 correctness).

(3.4.2.1) Detect Behavior Changes Over Time

Consider the problem of detecting changes in communication structure, especially during a stress situation, where the normal communication pathway switches to a novel pathway. The following communication dynamics are modeled. During a stressful situation, information goes from A to D directly, bypassing normal communication pathway. An example of a stressful situation is when signal transmissions are jammed or blocked in normal communication pathways.

(3.5) Experimental Results

The simulation was set as follows.

Sampling rate dt=0.1 second

Total simulation time=8 minutes. 3 minutes of first model, 2 minutes of transition, 3 minutes of second model During the transition phase, B and C increase their activity probability corresponding to A linearly (more eager to acquire information from A).

A, B, C: active probability=0.01

A→B: active probability=0.3, mean delay 3*dt

A→C: active probability=0.3, mean delay 3.5*dt

B→D: active probability=0.3, mean delay 4*dt

C→D: active probability=0.3, mean delay 4.5*dt

A→D: active probability=0.3, mean delay 4.5*dt

D→→E: active probability=0.5, mean delay 4.5*dt

Figure 11:
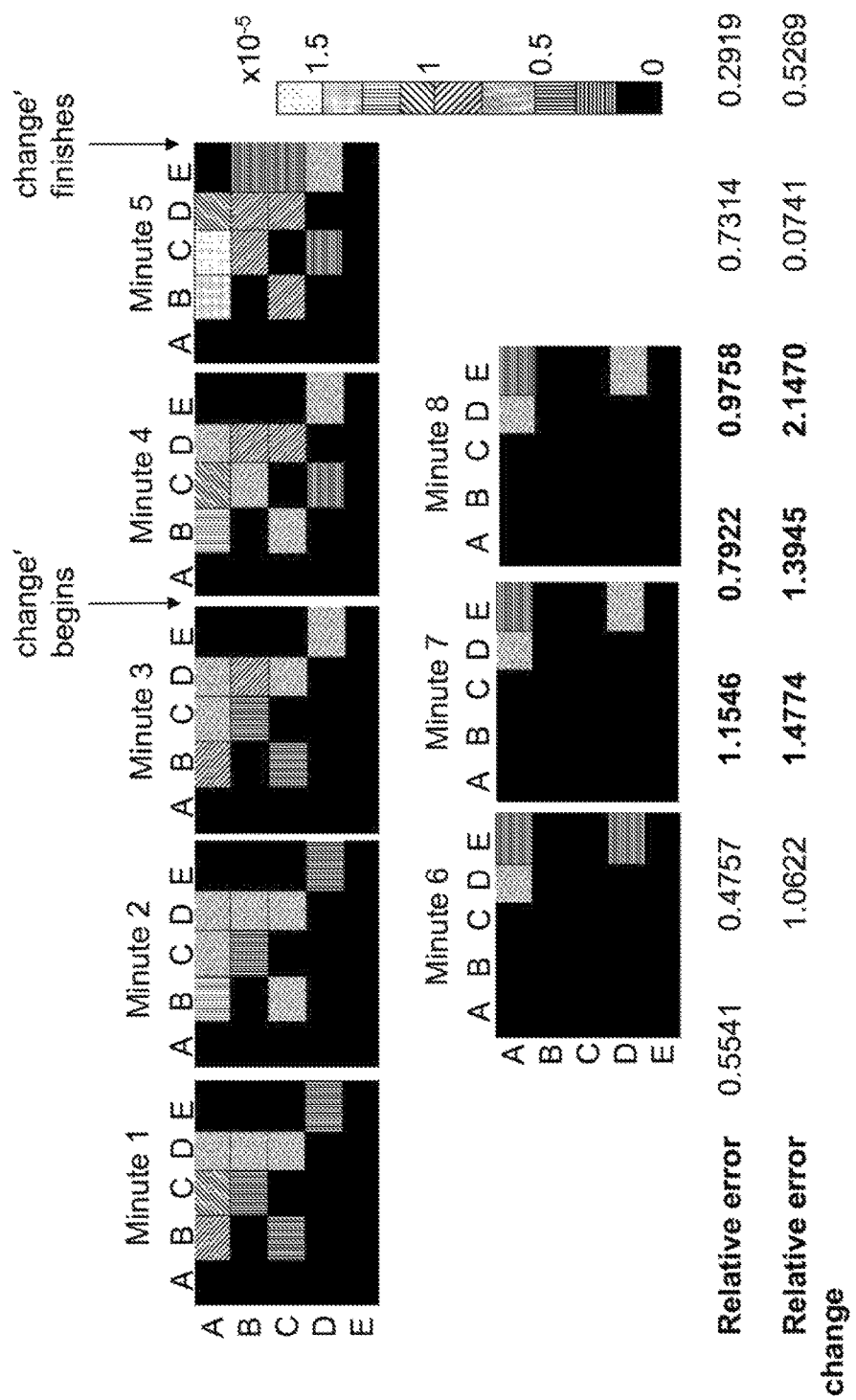
FIG. 11 is an illustration of simulation results according to some embodiments of the present disclosure.

The simulation results, shown in FIG. 11 which depict D matrices, demonstrate proof-of-concept for the detection and anticipation of behavior changes in response to the change in operational environments. The indicators for changes here are the relative error and its change rate. Relative error rate is determined according to the following:

$$\frac{\|D_{i+1} - D_i\|_F}{\|D_i\|_F},$$

where F stands for the Frobenium norm. Relative error change (i.e., change rate) is determined according to the following:

$$\frac{\|D_{i+1} - D_i\|_F}{\|D_i - D_{i-1}\|_F}.$$

The large relative error values and the large relative error change values (in bold font) coincide with change begins and change finish. Change points are detected using the relative error that suddenly increases (as shown in FIG. 11). When changes in communication patterns are detected, it provides insights as where and which ships to monitor for ship movement. This narrows down a search space and helps perform exploratory data analysis for identifying and classifying illegal fishing activities conducted by individual and group vessels. Discovery of communication patterns among ships provides insight for analysts to investigate unusual patterns and frequent patterns.

The system described herein addresses the important need of "sense making" from large-scale, heterogeneous data sources for intelligence community and business analytics (e.g., Big Data and internet of things—IoT). The invention is not obvious because of the unusual recognition of "flows" as a common information unit across heterogeneous data sources, and the foreign concept of quantifying flow dependency within and across multilayer information dynamics network described herein. The demonstration of the system according to embodiments of the present disclosure in the detection of "coordinated movements" for posturing maritime activities particularly breaks the ground ("ocean") for better sense making that adapts computation resources according to the dynamics and activities.

The invention is deployable as embedded decision support modules in the cloud computing infrastructures or as a stand alone system for the application areas of complex systems. Non-limiting examples of application areas include intelligence, surveillance and reconnaissance (ISR) for posturing maritime activities (as described herein), crisis management, social unrests, and financial markets. The technology, which is an improvement over prior art, results in detection and inference of system behaviors, activities, and dependency.

For instance, based on the identification of communication behaviors and detection of the changes, the invention described herein can help analysts monitor ship movements and illegal fishing. If there exists certain communication patterns much more frequently than normal and the ships coordinate to move to a certain region, but there is mismatch of fishery inventory, the communication patterns can provide evidence of illegal or suspicious fishing activities. The evidence can enable law enforcement to take necessary actions to stop illegal activities and prosecute those involved.

Additionally, based on the identified communication pattern or communication pattern changes (e.g., an increase in the relative error change), the system described herein can generate instructions regarding positioning of one or more sensors at regions that correspond to the a geographical region related to the identified communication pattern (element 524 in FIG. 5). For instance, when the communication pattern changes, the instructions can direct users to place sensors at the geographical regions that corresponding to the changes in order to monitor vessels at those regions. Given a collection of identified communication patterns (element 522, FIG. 5), the method described herein will simultaneously match the identified communication pattern with the subset of nodes (entities/locations) that participate in the communication pattern. This will work for a set of nodes that are much larger than the size of the communication patterns. Therefore, if certain communication patterns are of interest, the method according to embodiments of the present disclosure will inform which nodes/entities/locations to monitor in order to provide instructions for sensor placement (element 524, FIG. 5). The locations of the nodes is known from the definition of how the communication time series is being measured (i.e., each time series is the amount of communication activities at the defined location).

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for identifying communication behavior patterns, the system comprising:

one or more processors and a non-transitory computer-readable medium having executable instructions encoded thereon such that when executed, the one or more processors perform operations of:
identifying a communication pattern from a plurality of communication activity time series of a set of variables,
wherein identifying the communication pattern comprises:
for each pair of variables in the set of variables, determining a transfer entropy (TE) measure;
for each pair of variables in the set of variables, determining an effective transfer entropy (ETE) measure from a randomly reordered version of the plurality of communication activity time series;
for each pair of variables in the set of variables, determining a partial effective transfer entropy (PETE) measure, resulting in a plurality of pair-wised PETE measures;
generating a dependency matrix comprising elements using the plurality of pair-wised ETE measures and PETE measures, where each element in the dependency matrix represents a total influence of a communication activity time series on another communication activity time series in the future; and
comparing the dependency matrix with dependency matrices generated from a predefined set of communication patterns; and
generating instructions regarding positioning of at least one sensor using the identified communication pattern, such that the instructions provide guidance regarding placement of the at least one sensor at a geographical region related to the identified communication pattern.

2. The system as set forth in claim 1, wherein the one or more processors further perform an operation of generating a plurality of dependency matrices from the plurality of communication activity time series, each dependency matrix representing a distinct time point in a series of time points.

3. The system as set forth in claim 2, wherein the one or more processors further performs an operation of detecting changes in communication behavior over time, wherein changes in communication behavior are detected by determining a relative error using a first dependency matrix representing a first time point and a second dependency matrix representing a second time point following the first time point.

4. The system as set forth in claim 3, wherein the one or more processors further perform an operation of generating a prediction of changes in communication behavior, wherein the prediction of changes in communication behavior are determined using the relative error and a relative error change determined using the first dependency matrix representing the first time point, the second dependency matrix representing the second time point following the first time point, and a third dependency matrix representing a third time point preceding the first time point.

5. The system as set forth in claim 2, wherein the one or more processors further perform an operation of detecting change points in the plurality of communication activity time series.

6. The system as set forth in claim 1, wherein generating the dependency matrices from the predefined set of communication patterns further comprises operations of:
simulating communication activity time series for the predefined set of communication patterns; and
generating a dependency matrix for each communication pattern in the predefined set of communication patterns.

7. A computer program product for identifying communication behavior patterns, the computer program product comprising:
a non-transitory computer-readable medium having executable instructions encoded thereon, such that upon execution of the instructions by one or more processors, the one or more processors perform operations of:
identifying a communication pattern from a plurality of communication activity time series of a set of variables,
wherein identifying the communication pattern comprises:
for each pair of variables in the set of variables, determining a transfer entropy (TE) measure;
for each pair of variables in the set of variables, determining an effective transfer entropy (ETE) measure from a randomly reordered version of the plurality of communication activity time series;
for each pair of variables in the set of variables, determining a partial effective transfer entropy (PETE) measure, resulting in a plurality of pair-wised PETE measures;
generating a dependency matrix comprising elements using the plurality of pair-wised ETE measures and PETE measures, where each element in the dependency matrix represents a total influence of a communication activity time series on another communication activity time series in the future; and
comparing the dependency matrix with dependency matrices generated from a predefined set of communication patterns;
using the identified communication pattern; and
generating instructions regarding positioning of at least one sensor using the identified communication pattern, such that the instructions provide guidance regarding placement of the at least one sensor at a geographical region related to the identified communication pattern.

8. The computer program product as set forth in claim 7, further comprising instructions for causing the one or more processors to further perform an operation of generating a plurality of dependency matrices from the plurality of communication activity time series, each dependency matrix representing a distinct time point in a series of time points.

9. The computer program product as set forth in claim 8, further comprising instructions for causing the one or more processors to further perform an operation of detecting changes in communication behavior over time, wherein changes in communication behavior are detected by determining a relative error using a first dependency matrix representing a first time point and a second dependency matrix representing a second time point following the first time point.

10. The computer program product as set forth in claim 9, further comprising instructions for causing the one or more processors to further perform an operation of generating a prediction of changes in communication behavior, wherein the prediction of changes in communication behavior are determined using the relative error and a relative error change determined using the first dependency matrix representing the first time point, the second dependency matrix representing the second time point following the first time point, and a third dependency matrix representing a third time point preceding the first time point.

11. The computer program product as set forth in claim 8, further comprising instructions for causing the one or more processors to further perform an operation of detecting change points in the plurality of communication activity time series.

12. The computer program product as set forth in claim 7, wherein generating the dependency matrices from the predefined set of communication patterns further comprises operations of:
   simulating communication activity time series for the predefined set of communication patterns; and
   generating a dependency matrix for each communication pattern in the predefined set of communication patterns.

13. A computer implemented method for identifying communication behavior patterns, the method comprising an act of:
   causing one or more processors to execute instructions encoded on a non-transitory computer-readable medium, such that upon execution, the one or more processors perform operations of:
   identifying a communication pattern from a plurality of communication activity time series of a set of variables,
   wherein identifying the communication pattern comprises:
      for each pair of variables in the set of variables, determining a transfer entropy (TE) measure;
      for each pair of variables in the set of variables, determining an effective transfer entropy (ETE) measure from a randomly reordered version of the plurality of communication activity time series;
   for each pair of variables in the set of variables, determining a partial effective transfer entropy (PETE) measure, resulting in a plurality of pair-wised PETE measures;
      generating a dependency matrix comprising elements using the plurality of pair-wised ETE measures and PETE measures, where each element in the dependency matrix represents a total influence of a communication activity time series on another communication activity time series in the future; and
      comparing the dependency matrix with dependency matrices generated from a predefined set of communication patterns;
   using the identified communication pattern; and
   generating instructions regarding positioning of at least one sensor using the identified communication pattern, such that the instructions provide guidance regarding placement of the at least one sensor at a geographical region related to the identified communication pattern.

14. The method as set forth in claim 13, wherein the one or more processors further perform an operation of generating a plurality of dependency matrices from the plurality of communication activity time series, each dependency matrix representing a distinct time point in a series of time points.

15. The method as set forth in claim 14, wherein the one or more processors further performs an operation of detecting changes in communication behavior over time, wherein changes in communication behavior are detected by determining a relative error using a first dependency matrix representing a first time point and a second dependency matrix representing a second time point following the first time point.

16. The method as set forth in claim 15, wherein the one or more processors further perform an operation of generating a prediction of changes in communication behavior, wherein the prediction of changes in communication behavior are determined using the relative error and a relative error change determined using the first dependency matrix representing the first time point, the second dependency matrix representing the second time point following the first time point, and a third dependency matrix representing a third time point preceding the first time point.

17. The method as set forth in claim 14, wherein the one or more processors further perform an operation of detecting change points in the plurality of communication activity time series.

18. The method as set forth in claim 13, wherein generating the dependency matrices from the predefined set of communication patterns further comprises operations of:
   simulating communication activity time series for the predefined set of communication patterns; and
   generating a dependency matrix for each communication pattern in the predefined set of communication patterns.

* * * * *